Dec. 29, 1925.
R. D. KISBEY
SHOCK ABSORBER
Filed Oct. 20, 1924
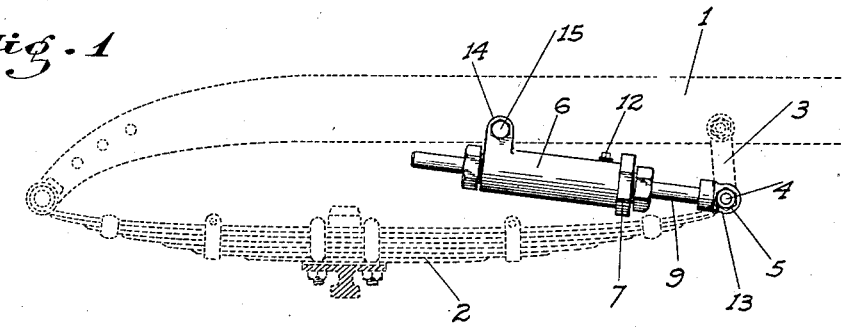
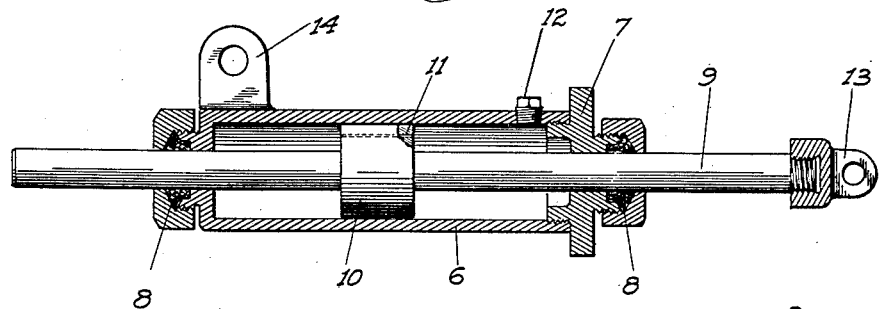
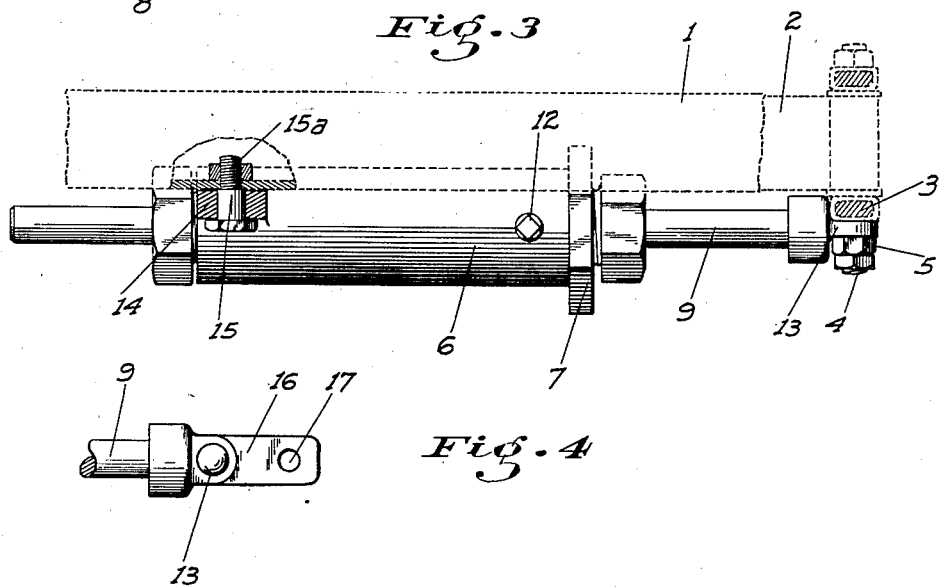
INVENTOR
*Roy D. Kisbey*
BY
ATTORNEY Patented Dec. 29, 1925.

1,567,517

UNITED STATES PATENT OFFICE.

ROY D. KISBEY, OF SACRAMENTO, CALIFORNIA.

SHOCK ABSORBER.

Application filed October 20, 1924. Serial No. 744,661.

*To all whom it may concern:*

Be it known that I, ROY D. KISBEY, a citizen of the United States, residing at Sacramento, county of Sacramento, State of California, have invented certain new and useful Improvements in Shock Absorbers; and I do declare the following to be a full, clear, and exact description of the same, reference being had to the accompanying drawing, and to the characters of reference marked thereon, which form a part of this application.

This invention relates to improvements in shock absorbing devices for use on motor vehicles of all kinds, to prevent and absorb the usual severe rebound action of the springs when the condition of the road over which the vehicle is passing is such as to cause the springs to be brought into abnormal action.

The principal object of my invention is to provide a hydraulic shock absorber, one for each spring, in which a fluid forms the shock absorbing medium, adapted to be connected to the frame and springs of the car in such a manner that with normal conditions no strain or load is taken by the device, and the springs are enabled to function normally and without restriction. At the same time, whenever the springs tend to be suddenly and unduly depressed, the shock absorber instantly functions to prevent both said sudden depression and the consequent sharp rebound action of the springs, which is a source of discomfort to the riders and a frequent cause of spring breakage.

The shock absorber operates through the movable shackle of the spring to which it is connected. The spring end of the shackle moves through an arc with the depression or flattening of the spring, the length of this arc of movement increasing in proportion to the extent of spring movement.

It is a further object of my invention to construct the shock absorber in such a manner that it may be connected at one end to the shackle without removing the same or without mounting some other part in the place of the shackle, which remains on the vehicle to function in the manner intended by the makers. The other end of the shock absorber is connected to the frame of the car by a single bolt, the mounting of which is the only operation necessitating the use of tools other than an ordinary wrench. Even with this operation, the installation of a complete set of four of my shock absorbers on a car is such a simple matter that it may be readily accomplished in an hour and a half or less.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views:

Fig. 1 is a side outline of a front-end spring and frame of an automobile, showing my shock absorber installed thereon.

Fig. 2 is a sectional elevation of the device, detached.

Fig. 3 is a top plan view of the device as assembled on the car, the frame of which is broken away.

Fig. 4 is a fragmentary view showing a modified form of shackle connection.

Referring now more particularly to the characters of reference on the drawings, the numeral 1 denotes one of the side frames of an automobile mounted below which is a front spring 2, directly connected at its front end to the frame in the usual manner and at its rear end indirectly connected to the frame through the medium of a shackle 3 pivoted on the frame and the adjacent end of the spring as is customary.

This shackle, at its lower end, has a bolt 4 passing therethrough and through the spring, with a nut 5 on one end thereof. The foregoing parts are standard and I do not change any of the same.

My improved shock absorber comprises a substantial cylinder, solid at one end and provided with a removable cap 7 on the other end. Provided in the cap and solid end of the cylinder are bearing and packing gland structures 8 of common type, for a shaft 9 slidably mounted therein and preferably projecting from the cylinder at both ends.

Fixed on the shaft is a piston 10, having a close running fit in the cylinder, and provided with a small bleed hole 11 therethrough, this being the sole passage means from one side of the piston to the other.

The cylinder is to be completely filled with oil on both sides of the cylinder, upon removing a plug 12 therein.

On one end of the shaft is an eye 13 adapted to fit over the portion of the shackle bolt 4 outwardly of the shackle, the nut 5 being first removed to allow the eye to fit close against the shackle, and being then replaced to hold said eye in place.

The cylinder, adjacent the end thereof opposite to the eye 13, is provided with a substantially radial lug 14 adapted to pivot on a bolt 15 whose threaded portion 15ª, beyond the lug, is reduced in size and adapted to screw into the frame 1.

By reason of this construction, the bolt may be cinched up tight against the frame without binding and preventing the lug and cylinder from turning.

Should the relative transverse alinement of the spring shackle and frame of certain cars be such that direct connection between said eye and the spindle bolt cannot be made, I use said eye to secure a short strip 16 of strap iron or the like thereto, which strip could be bent laterally as might be required to offset the out-of-alinement of the frame and shackle. This strip would have the orifice 17 to pass over the shackle bolt.

In installing the device, it is only necessary to drill and tap a single hole in the frame to receive the bolt portion 15ª, this hole being so located relative to the shackle that when the device is connected to the bolt 15 and the shackle, with the latter in its normal position, the piston 10 will be centrally disposed in the cylinder.

In operation, as long as the spring is not deflected and the shackle is consequently motionless, the shock absorber is dormant, and is not under any load or strain. With slight and slow deflections of the spring, as with good road conditions, the swinging movement of the shackle is correspondingly slight. The absorber shaft 9 moves the same amount and at the same slow speed, thus giving the oil plenty of time to pass from one side of the piston to the other to equalize the pressure, without interfering with this normal spring movement. When however the spring is suddenly and violently deflected, causing a corresponding sudden and relatively great movement of the shackle, this sudden movement is imparted to the shaft 9. The oil in the cylinder, not being able to pass with great rapidity through the piston passage 11, provides a resistance and cushioning effect to this spring action, preventing it from taking place to the sudden extent which it otherwise would. A similar resistance and cushioning effect is also had when the spring is returning to its normal position.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A shock absorber for attachment to a leaf spring of a vehicle, said spring having at one end a shackle attached thereto and to the frame of the vehicle for swinging movement with the flexing of the spring; comprising a pair of telescoping members mounted together with shock absorbing means therebetween and arranged to extend longitudinally of the spring, means whereby the outer end of one member may be pivotally attached to the bolt of the shackle at the spring end thereof, and means for pivotally attaching the other member adjacent its end farthest from the shackle, onto the frame of the car.

2. A shock absorber for attachment to a leaf spring of a vehicle, said spring having at one end a shackle attached thereto and to the frame of the vehicle for swinging movement with the flexing of the spring; comprising a pair of telescoping members mounted together with shock absorbing means therebetween and arranged to extend longitudinally of the spring, to one side of the same, means whereby the outer end of one member may be pivotally attached to the bolt of the shackle at the spring end thereof, and an orificed lug on the other member adjacent the end thereof farthest from the shackle, positioned to lie against one side of the frame of the vehicle, whereby a pivotal pin may be passed through said lug and frame.

3. A shock absorber for attachment to a leaf spring of a vehicle, said spring having at one end a shackle attached thereto and to the frame of the vehicle for swinging movement with the flexing of the spring; comprising a pair of telescoping members mounted together with shock absorbing means therebetween and arranged to extend longitudinally of the spring, an eye on the outer end of one member adapted to fit over one end of the spring-end shackle and bolt, and an orificed lug on the other member adjacent the end thereof farthest from the shackle adapted to be pivotally secured to the frame of the vehicle.

In testimony whereof I affix my signature.

ROY D. KISBEY.